United States Patent Office 3,457,046
Patented July 22, 1969

3,457,046
SULFUR PRODUCTION
James Hoekstra, Evergreen Park, Ill., assignor to Universal Oil Products Company, Des Plaines, Ill., a corporation of Delaware
No Drawing. Filed Dec. 27, 1966, Ser. No. 604,576
Int. Cl. C01b 17/02
U.S. Cl. 23—224                           10 Claims

ABSTRACT OF THE DISCLOSURE

Oxidation of sulfide solution with about 0.50–0.90 atoms of oxygen per atom of sulfur in the presence of a solid oxidizing catalyst to effect polysulfide formation which carries elemental sulfur out of the reaction zone and substantially prevents deactivation of the catalyst by sulfur deposition, followed by decomposition of the polysulfide.

---

The subject of the present invention is a process for the production of sulfur from a sulfide solution. More specifically, the present invention is concerned with the rectification of a deactivation problem that has heretofore plagued processes, employing a solid catalyst, for oxidizing sulfide solutions. This deactivation problem essentially involves the deposition of elemental sulfur on the surface of the solid catalyst. This deposited sulfur, gradually blocks access of the reactants to the active sites of the catalytic surface and over a period of time, consequently, deactivates the catalyst. The concept of the present invention follows from my recognition that an ideal solution to this deactivation problem involves a procedure which minimizes the amount of free elemental sulfur formed in the oxidation zone. I have now found such a procedure, and it essentially involves the continuous stoichiometric control over the reactants injected into the oxidation zone in order to effect the formation of a soluble polysulfide between the produced sulfur and excess sulfide solution. This polysulfide formation reaction is, accordingly, continuously utilized in the present invention to carry elemental sulfur out of the oxidation zone, thereby substantially preventing deactivation of the catalyst by sulfur deposition. This elemental sulfur, is thereafter, easily recovered from the polysulfide-containing effluent from the oxidation zone.

As part of the price that has to be paid for a modern industrial society, large quantities of undesired solutions of sulfide compounds are currently available, as waste streams, from a number of industrial sources. In particular, aqueous solutions containing hydrogen sulfide are undesired side products of many economically significant industrial processes in the chemical, petroleum, and steel industries. For instance, in the petroleum industry, large quantities of solutions of sulfide compounds are produced by such processes as hydrorefining, hydrocracking, reforming, and the like. In fact, a common feature of all of these processes is that they operate on a petroleum fraction, a shale oil, a coal tar oil, and the like, which invariably contains organic and inorganic sulfur compounds. During the course of these petroleum processes, at least a portion of the organic sulfur compounds are converted into hydrogen sulfide and hydrocarbons. The resultant hydrogen sulfide is then, typically, removed from these processes by absorption in a suitable scrubbing solution. In a large measure, these scrubbing solutions are aqueous alkaline solutions and their disposal presents a problem, because of their potential biological oxygen demand which is primarily a consequence of the presence of sulfide ion. In a case of particular interest, hydrorefining of petroleum distillates, large quantities of ammonia and hydrogen sulfide are produced and these are generally absorbed in an aqueous solution which is withdrawn from the process. This aqueous sulfide solution then must either be regenerated or disposed of; obviously, either alternative normally requires the substantial elimination of sulfide ion. In a similar vein, sweetening treatment of natural gas with a suitable scrubbing fluid, such as monoethanolamine, also results in a solution containing sulfide ion which, once again, must be regenerated or disposed of. These sulfide solutions are typical of those that are treated in the process of the present invention.

The sulfide compound present in these solutions is generally present as a salt of a strong base such as ammonium sulfide, sodium sulfide, potassium sulfide, and the like, which may be ionized to the various degrees. Moreover, these sulfide compounds may be present in the same kind of polar association which characterizes, for instance, solutions of hydrogen sulfide and diethanolamine. In this respect, it should be remembered that hydrogen sulfide because of its polar nature is soluble in aqueous solutions to some degree even in the absence of an appropriate solubility-increasing agent; for example, at 20° C. and 1 atmosphere pressure, 2.5 ml. of hydrogen sulfide will dissolve in 1 ml. of water. Thus, hydrogen sulfide is typical of the sulfide compounds present in these sulfide solutions.

Quite understandably, in recent years attention has been focused upon means for converting these sulfide compounds into forms which have less demand for oxygen and, if possible, into a form which has a substantial economic value. I have now found a process for converting these sulfide compounds into elemental sulfur, which process employs a solid catalyst and obviates the principal catalytic deactivation problem of the pror art. Basically, my process involves a procedure of oxidizing the sulfide solutions under conditions effecting the formation of a soluble polysulfide as the principal product of the reaction. I have found that this can be accomplished by carefully controlling the amount of oxygen entering the oxidation zone such that an amount less than the stoichiometric amount required to convert all of the sulfide in the entering solution to elemental sulfur is injected.

Without limiting myself by this explanation, I believe that the reaction mechanics of the process of the present invention are as follows: (1) the oxygen present in the reaction zone reacts with a portion of the sulfide solution to produce elemental sulfur, and (2) the resultant sulfur then reacts with the remaining portion of the sulfide solution to form a soluble polysulfide. In any event, a polysulfide-containing effluent is observed when the process is run in a manner such that oxygen is available in an amount less than the stoichiometric amount needed to oxidize all of the sulfide to sulfur. Moreover, I have observed that, when sufficient excess sulfide solution is available, essentially all of the sulfur that is produced is carried out of the oxidation zone in the polysulfide-containing effluent, and very little deposits on the catalyst.

It is, accordingly, one object of my invention to provide a process employing a solid catalyst for the production of elemental sulfur from a sulfide solution. A second object is to provide a process employing a solid catalyst for reducing the biological oxygen demand of a sulfide solution. A third object is to provide a procedure to prevent deactivation by sulfur deposition of a solid catalyst employed in sulfide oxidation service. Another object is to provide a procedure for continuously stripping deposited sulfur from the surface of a solid catalyst which is simultaneously employed in sulfide oxidation service.

In a broad embodiment, the present invention relates to a process for the production of sulfur which comprises: contacting a sulfide solution and from about 0.50 to about 0.90 atom of oxygen per atom of sulfur in the sulfide solution with a solid oxidizing catalyst in a first reaction zone, at conditions effecting polysulfide formation; withdrawing a polysulfide-containing effluent from the first reaction zone; and subjecting this effluent, in a second reaction zone, to conditions effecting decomposition of the polysulfide into elemental sulfur and a sulfide compound.

Another broad embodiment of the present invention encompasses a process for the oxidation of an aqueous, ammoniacal solution of hydrogen sulfide to produce elemental sulfur. This process comprises the steps of: contacting the aqueous, ammoniacal sulfide solution and from about 0.50 to about 0.90 atom of oxygen per atom of sulfur in said sulfide solution with a solid oxidizing catalyst, in a first reaction zone at conditions effecting polysulfide formation; withdrawing a polysulfide-containing effluent from the first reaction zone, subjecting this effluent, in a second reaction zone, to conditions effecting decomposition of the polysulfide into elemental sulfur and hydrogen sulfide; stripping at least a portion of the resultant hydrogen sulfide from the treated effluent; absorbing at least a portion of the stripped hydrogen sulfide in an aqueous, ammoniacal solution; and recycling the resultant solution to said first reaction zone.

Other embodiments and objects of the present invention encompass particular sulfide-containing solutions, oxidizing catalyst, process conditions, and process configuration, which are hereinafter disclosed in the discussion of each of these facets of the present invention.

At this point, it is to be recognized that a prominent feature of the present invention is the utilization of excess sulfide solution to prevent the build-up of deposited sulfur on the surface of a solid catalyst employed in sulfur production service. This procedure results in the removal of the deposited sulfur at the same rate at which it is formed; thus, the deactivating effect of this deposited sulfur is greatly reduced. Additionally, since the sulfide solution acts in the present invention as a mechanism for regenerating the solid catalyst, a sulfur-removing catalyst regeneration procedure is not necessary.

As pointed out hereinbefore, the solution that is charged to the process of the present invention contains a sulfide compound. This solution may be derived from any industrial operation such as those commonly available from chemical plants, sewage treatment plants, etc. The solvent utilized in forming this solution may be aqueous, alcoholic, or any other suitable polar organic solvent. The solution is typically an aqueous solution and as such is commonly referred to as "waste water." Furthermore, the sulfide compounds are generally present in small concentrations—less than 5% by weight of the solution—although the present invention works well with solutions having higher concentrations of sulfide compounds. In addition, the solution typically contains one or more components which enhance the solubility of sulfide; examples of these are: ammonia; metal salts of weak acids such as alkaline metal carbonates, phosphates, etc.; organic bases such as methyl amine, ethyl amine, ethanolamine, propanolamine, etc.; and others well known in the art. As previously noted, a particularly important class of sulfide solutions are ammoniacal, aqueous solutions of hydrogen sulfide.

Another essential reactant for the process of the present invention is oxygen. This may be present in any suitable form, either by itself or mixed with other gases. It is an essential feature of the present invention that oxygen is present in an amount less than the stoichiometric amount required to oxidize all of the sulfide in the solution to elemental sulfur. Ordinarily, it is required that oxygen be present in a mole ratio of from about 0.50 to about 0.90 atom of oxygen per atom of sulfur in the solution being treated. The exact value within this range is selected such that sufficient sulfide remains available to react with the net sulfur production—that is to say, the present invention requires that sufficient excess sulfide be available to form polysulfide with the elemental sulfur that is the product of the primary oxidation reaction. Since one mole sulfide solution will react with many moles of sulfur it is generally only necessary that a small amount of sulfide solution remain unoxidized—for instance, for an ammoniacal, aqueous solution of hydrogen sulfide it was found (as shown hereafter in Example II) that 25% of this sulfide solution could efficiently and effectively carry away the elemental sulfur produced by the oxidation of the other 75% of the sulfide solution. For other sulfide compounds, and mixtures of sulfide compounds, the exact amount of unreacted sulfide solution necessary to carry off the net production of elemental sulfur can be determined by suitable experimentation familiar to those skilled in the art.

As previously indicated, the oxidation portion of the process of the present invention utilizes a solid oxidizing catalyst. Any suitable solid oxidizing catalyst that it capable of effecting substantially complete oxidation of the sulfide compounds to elemental sulfur may be utilized in the present invention. In particular, I have found that two preferred classes of catalyst for the reaction of interest of the present invention are metallic sulfide catalysts and metal phthalocyanine catalysts.

The preferred metallic sufide catalyst is selected from the group consisting of sulfides of nickel, cobalt, and iron, with nickel being preferred. Moreover, in some cases, mixtures of these metallic sulfides may be employed. Although it is possible to practice the present invention with a solid bed of the metallic sulfide, it is preferred that the metallic sulfide be composited with a suitable carrier material. Examples of suitable carrier materials are: coal, charcoal, such as wood charcoal, bone charcoal, etc., which may be activated prior to use; alumina, silica, zirconia, kieselguhr, baxite, carbons, and other natural or synthetic highly porous refractory inorganic oxide carrier materials. Preferred carrier materials are alumina and activated charcoal. Any suitable means of compositing the catalyst with the support may be used, such as impregnating it by immersing it in a solution of a soluble salt of the desired metallic components, thereafter washing and drying it. The metallic component can then be converted to the sulfide by treament with hydrogen sulfide preferably at room temperature, or utilized as such in the process with the conversion to the sulfide being effected during the initial part of the processing period. In some cases, it may be advantageous to calcine the impregnated carrier material prior to sulfiding it. In general, when the metallic sulfide is composited with a carrier material, the amount by weight of the metallic component may range up to about 60% or more of the total composite. However, it is generally preferred to operate in the range of from about 10% to about 50% by weight of the total composite.

Yet another preferred catalyst for use in the present invention is a metal phthalocyanine catalyst composited with a suitable carrier material. Particularly preferred metal phthalocyanine catalysts include those of cobalt and vanadium. Other metal phthalocyanine catalysts that may be utilized include those of iron, nickel, copper, molybdenum, manganese, tungsten and the like. Moreover, any suitable derivative of the metal phthalocyanine may be employed including the sulfonated derivative, the carboxylated derivative and the like. In the present invention, the phthalocyanine catalyst is utilized as a composite with a suitable adsorptive carrier material. The preferred carrier material is activated carbon. Additional details as to the alternative carrier materials, methods of preparation, and the preferred amounts of catalytic components, are given in the teachings of U.S. Patent No. 3,108,081 for these phthalocyanine catalysts.

The process of the present invention can be effected in any suitable manner—either as a batch or continuous operation. A particularly preferred system involves a fixed bed of solid catalyst disposed in a reaction zone.

The sulfide solution is then passed therethrough in either upward, radial, or downward flow; and the oxygen is passed thereto in either concurrent or countercurrent flow.

In other embodiments, the catalysts may be utilized in a slurry or suspensoid operation wherein the catalyst passes either concurrently or countercurrently to the sulfide solution and oxygen. In other cases, it may be advantageous to effect the oxidation reaction in a multi-stage manner.

The oxidation portion of the process of the present invention is conducted at any suitable temperature which may range from about 0° C. up to about 200° C. or more, with a temperature of about 30° C. to about 100° C. yielding best results. The pressure employed can be any pressure which maintains the sulfide solution in the liquid phase. In general, it is preferred to operate at superatmospheric pressures, and a pressure from about 25 p.s.i.g. to about 75 p.s.i.g. is particularly preferred. Additionally, the liquid hourly space velocity (commonly referred to as LHSV and defined to be the volume rate of charging the sulfide solution divided by the total volume of catalyst within the oxidation zone) is preferably in a range of from about 0.5 to about 4.0.

The polysulfide-containing effluent from the oxidation zone of the present invention is passed to a second reaction zone wherein it is treated by any of the well-known procedures designed to decompose polysulfides into elemental sulfur and a sulfide compound. In some cases, this treatment may involve addition of an acid in combination with a stripping operation to remove liberated hydrogen sulfide. For instance, with sodium polysulfides the addition of hydrochloric acid results in the evolution of hydrogen sulfide and the liberation of free elemental sulfur. In other cases, the application of a temperature of about 50° C. to about 150° C. higher than that utilized in the oxidation zone of the present process is sufficient by itself to bring about the desired decomposition. In most cases, it is usually convenient to increase the rate at which the hydrogen sulfide is stripped from the second reaction zone, by injecting an inert gas such as steam, air, etc., into the reaction zone. In any event, the decomposition reaction in the second reaction zone generally results in hydrogen sulfide being taken off over-head and an elemental sulfur containing slurry being withdrawn as bottoms. The sulfur can be recovered from this slurry effluent by any of the methods known in the art of removing solid particles from a liquid such as filtration, centrifugation, settling, etc. After the sulfur is removed, the remaining liquid typically has such reduced oxygen demand that it can be conveniently disposed of in neighboring streams and rivers, if such is desired. On the other hand, it can be recycled to the process from which it initially came for further use therein, if such is desired.

The hydrogen sulfide that is generally liberated in the second reaction zone can be disposed of in any suitable manner. A particularly preferred procedure is to absorb the hydrogen sulfide in an aqueous, ammoniacal solution, and recycle the resultant solution to the oxidation zone. Likewise, in some cases, the hydrogen sulfide can be absorbed in the sulfide solution that is being charged to the process of the present invention. These recycle procedures result in the maximum production of elemental sulfur from the sulfide solution charged to the present process.

The following examples are given to illustrate further the novelty, mode of operation, and utility of the present invention. It is not intended to limit unduly the present invention to the flow scheme, process conditions, and types of catalysts employed therein, since these are intended to be illustrative rather than restrictive.

EXAMPLE I

This example shows the substantial sulfur aquisition capability of a solid oxidizing catalyst when it is employed in sulfide solution oxidation service without the benefits of the present invention.

An alumina carrier material was manufactured in accordance with the method delineated in U.S. Patent No. 2,620,314 by passing droplets of an alumina hydrosol into an oil bath by means of a nozzle or a rotating disk. After specific aging, drying, and calcining techniques, as specified in the reference patent, the carrier material was impregnated in a rotary evaporator, with a solution of nickel nitrate in an amount sufficient to result in the final composite having 20% nickel by weight. After drying, the impregnated carrier material was saturated with gaseous ammonia and, thereafter, subjected to a temperature of 95° C. in order to drive off excess ammonia. Subsequently, the resultant composite was successively washed with water, dried, and sulfided by passing a stream of hydrogen sulfide diluted with nitrogen over it at room temperature.

The resultant catalyst, in an amount of 100 cc. was then charged to a reaction zone. An aqueous feed stream containing 1.67% by weight of ammonia and 2.35% by weight of sulfide (calculated as sulfur) was then charged to the reaction zone at a rate of 100 ml. per hour, thus setting the LHSV at about 1.0. The reaction zone was maintained during the entire run at an inlet pressure of 50 p.s.i.g. and a temperature of 35° C. During the course of the run, air was injected into the reaction zone at a rate sufficient to supply 1.2 atoms of oxygen per each atom of sulfur in the sulfide feed stream.

After a line-out period, the run was divided into a series of test periods of three hours duration. During these test periods the effluent from the reaction zone was collected. Thereafter, these samples were analyzed using conventional procedures for kind and quantity of sulfur compounds. Results of this analysis were: for the first test period, a conversion of sulfide of 98% based on weight of sulfur in the feed stream, but the 95% of sulfide that went to elemental sulfur only 19% of the resultant sulfur was recovered in the effluent; for the second test period, on the same basis as before, the conversion of sulfur was recovered in the effluent; for the second test to elemental sulfur only 50% of the sulfur was recovered in the effluent; and for the third period, conversion of sulfide was 91%, and of the 85% of the sulfide in the feed stream that went to elemental sulfur only 68% of the resultant sulfur showed up in the effluent. Hence, it is clear that substantial quantities of sulfur are being deposited on the catalyst. This fact was confirmed by subsequent analysis of the catalyst.

This data then illustrates the substantial deposition of elemental sulfur on the catalyst along with the attendant decline in catalyst activity, which characterizes a sulfide oxidation process when it is run in a straightforward fashion.

EXAMPLE II

In order to clearly show the benefits of the present invention, a run was made using the process of the present invention with the same feed stock and catalyst of Example I. The only change in the process conditions was that the rate of injection of air was sufficient to supply 0.75 atoms of oxygen per atom of sulfur in the feed stream—that is to say, approximately 0.75 of the stoichiometric amount of oxygen necessary to oxidize sulfide to sulfur. In accordance with the present invention a sulfide solution in admixture with oxygen was passed into a reaction zone in which a bed of solid catalyst prepared by the method delineated in Example I was maintained. The effluent from the reaction zone was then passed to a second reaction zone in which any polysulfide contained in the effluent was decomposed into elemental sulfur, ammonia, and hydrogen sulfide. After a line-out period, a test run of 10 hours was made. During this test run a sulfur balance was made on the plant with the following results: first, 76% of the sulfide present in the feed stream during this period was oxidized; second, 96% of the total sulfur charged to the plant during this period turned up in the effluent from the plant; third, 72% of the sulfide was oxidized to elemental sulfur; finally, 94% of the sulfide that was oxidized to sulfur was carried out of the oxidation zone as an ammonium polysulfide which was subsequently decomposed to yield elemental sulfur. Consequently, it is evident that almost all of the sulfur produced in the oxidation reaction was carried out of the oxidation zone as a polysulfide and very little sulfur was deposited on the catalyst. This is in sharp contrast with the results of Example 1, since there large amounts of the resultant elemental sulfur were adsorbed on the catalyst.

EXAMPLE III

A composite of cobalt phthalocyanine monosulfonate on activated carbon is prepared by dissolving cobalt phthalocyanine sulfonate in water to which a trace of ammonium hydroxide is added. Activated carbon granules of 30–40 mesh are added to the solution with stirring. The mixture is allowed to stand, and then is filtered to separate excess water. The catalyst is then dried and is found to contain 0.5% by weight of the phthalocyanine compound. This catalyst, in an amount of 100 cc., is then charged to a reaction zone. An aqueous sulfide solution, containing sodium sulfide in an amount sufficient to provide 1% by weight of sulfur, is then charged to the reaction zone at a liquid hourly space velocity of 1.0. Simultaneously, air in an amount sufficient to supply 0.70 atoms of oxygen per atom of sulfur in the feed stream is injected into the reaction zone. The reaction zone is maintained at a temperature of 35° C. and a pressure of 50 p.s.i.g. A polysulfide-rich effluent is then withdrawn from the reaction zone and commingled with hydrochloric acid in an amount sufficient to supply one mole of hydrochloric acid for every mole of sodium polysulfide. The resultant solution is then charged to a second reaction zone which is maintained at a temperature of 35° C. Air is then injected into the lower regions of the second reaction zone to act as a stripping medium for the hydrogen sulfide that is given off by the decomposition of the sodium polysulfide. A hydrogen sulfide-rich air stream is then withdrawn from the upper regions of the second reaction zone and is redissolved in an ammoniacal, aqueous solution. A slurry of sulfur is withdrawn from the lower regions of the second reaction zone and subjected to filtering in order to recover elemental sulfur. This process is operated for a prolonged period of time with very little sulfur being deposited on the catalyst in the reaction zone. Moreover, the aqueous solution that is withdrawn from the process after having passed through the sulfur filter is found to contain substantially no sulfide compounds; and accordingly, is suitable for reuse or, alternatively, for discharge in neighboring streams and rivers.

I claim as my invention:

1. A process for the production of sulfur which comprises contacting a sulfide solution in liquid phase and from about 0.50 to about 0.90 atoms of oxygen per atom of sulfur in said sulfide solution with a solid oxidizing catalyst, in a first reaction zone at conditions effecting polysulfide formation, utilizing said polysulfide formation to carry element sulfur out of the reaction zone and thereby substantially preventing deactivation of said catalyst by sulfur deposition, withdrawing a polysulfide-containing effluent from said first reaction zone, and subjecting said effluent, in a second reaction zone, to conditions effecting decomposition of said polysulfide into elemental sulfur and a sulfide compound.

2. The process of claim 1 further characterized in that said sulfide solution is an alkaline, aqueous solution of a sulfide compound.

3. The process of claim 1 further characterized in that said sulfide solution is an aqueous, ammoniacal solution of hydrogen sulfide.

4. The process of claim 1 further characterized in that said solid oxidizing catalyst comprises a metal phthalocyanine composited with a carrier material.

5. The process of claim 1 further characterized in that said oxidizing catalyst comprises a sulfide of a metal selected from the group consisting of nickel, iron, cobalt, and mixtures thereof, composited with a carrier material.

6. The process of claim 1 further characterized in that said conditions effecting polysulfide formation include a temperature of about 0° C. to about 200° C.

7. The process of claim 1 further characterized in that said conditions effecting decomposition of said polysulfide include a temperature of about 50° C. to about 150° C. higher than that employed in said first reaction zone.

8. The process of claim 3 further characterized in that the sulfide compound that is a product of said decomposition is hydrogen sulfide and that at least a portion of it is stripped from said effluent.

9. The process of claim 8 further characterized in that said stripped hydrogen sulfide is absorbed in an aqueous, ammoniacal solution and that the resultant solution is recycled to said first reaction zone.

10. The process of claim 1 further characterized in that said elemental sulfur is recovered by filtering a sulfur-containing effluent from said second reaction zone.

References Cited

UNITED STATES PATENTS

| 2,559,325 | 7/1951 | Spillane | 23—224 |
| 2,034,865 | 5/1962 | Urban | 23—225 |

FOREIGN PATENTS

| 748,037 | 4/1956 | Great Britain. |

OSCAR R. VERTIZ, Primary Examiner

G. O. PETERS, Assistant Examiner